US011275809B2

(12) United States Patent
Jiang et al.

(10) Patent No.: US 11,275,809 B2
(45) Date of Patent: Mar. 15, 2022

(54) PRE-COMPUTED SERVICE METRIC LOOKUP FOR A NETWORK-BASED SERVICE

(71) Applicant: Uber Technologies, Inc., San Francisco, CA (US)

(72) Inventors: Jun Jiang, San Francisco, CA (US); Daniel Bilen, San Francisco, CA (US); Sergey Gitlin, San Francisco, CA (US); James Lee, San Mateo, CA (US); Lisa Guo, San Francisco, CA (US); Qing Feng, San Francisco, CA (US); Songyan Hou, San Francisco, CA (US); Ximing Chen, San Francisco, CA (US); Atul Kakkur, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 161 days.

(21) Appl. No.: 16/562,292

(22) Filed: Sep. 5, 2019

(65) Prior Publication Data
US 2020/0081933 A1 Mar. 12, 2020

Related U.S. Application Data

(60) Provisional application No. 62/728,029, filed on Sep. 6, 2018.

(51) Int. Cl.
*G06F 16/9537* (2019.01)
*H04L 29/08* (2006.01)
(Continued)

(52) U.S. Cl.
CPC ...... *G06F 16/9537* (2019.01); *G06F 16/9538* (2019.01); *H04L 67/18* (2013.01); *H04L 67/32* (2013.01)

(58) Field of Classification Search
CPC ............ G06F 16/9537; G06F 16/1752; G06F 16/9538; H04L 67/1023; H04L 67/32; H04L 67/18; H04L 67/327
See application file for complete search history.

(56) References Cited

U.S. PATENT DOCUMENTS

2015/0161752 A1*  6/2015  Barreto .......... G06Q 10/063114
                                                705/7.15
2016/0104112 A1*  4/2016  Gorlin ............. G06Q 10/08355
                                                705/338

(Continued)

*Primary Examiner* — Frantz B Jean
(74) *Attorney, Agent, or Firm* — Mahamedi IP Law LLP

(57) ABSTRACT

A network system for managing a network-based service (e.g., an on-demand transport service) is configured to pre-compute, based on historical data, a plurality of service metrics that are maintained in a searchable database. In response to user interaction with a user application to view available service options, the user application can cause session data indicating start and service locations to be transmitted to the network system. In response, the network system can translate the start and service locations to a first and second search keys, respectively. The search keys can be used to query the database for the relevant service metric for the session. The network system can transmit the relevant service metric to the user device to enable the user device to display information relating to the session (e.g., a price for requesting the network-based service) that is based at least in part on the relevant service metric.

20 Claims, 7 Drawing Sheets

(51) Int. Cl.
*G06F 16/9538* (2019.01)
*H04L 67/52* (2022.01)
*H04L 67/60* (2022.01)

(56) References Cited

U.S. PATENT DOCUMENTS

| | | | |
|---|---|---|---|
| 2017/0255966 A1* | 9/2017 | Khoury | H04L 67/20 |
| 2019/0109926 A1* | 4/2019 | Hotchkies | H04L 67/327 |
| 2019/0230180 A1* | 7/2019 | Wang | G06F 16/909 |
| 2020/0221257 A1* | 7/2020 | Zhang | H04W 4/025 |
| 2021/0213933 A1* | 7/2021 | Borrelli | B60W 20/13 |

* cited by examiner

PRE-COMPUTED SERVICE METRIC LOOKUP FOR A NETWORK-BASED SERVICE

RELATED APPLICATION

This application claims benefit of priority to U.S. Provisional Patent Application No. 62/728,029, filed on Sep. 6, 2018, and titled "Pre-Computed Service Metric Lookup for A Network-Based Service"; the aforementioned application being hereby incorporated by reference in its entirety.

BACKGROUND

A network-based service can enable users to request and receive various network-based services through applications on mobile computing devices. The network-based service can match a service provider with a requesting user based on the current location of the service provider and a start location specified by the requesting user or determined based on the current location of the requesting user.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
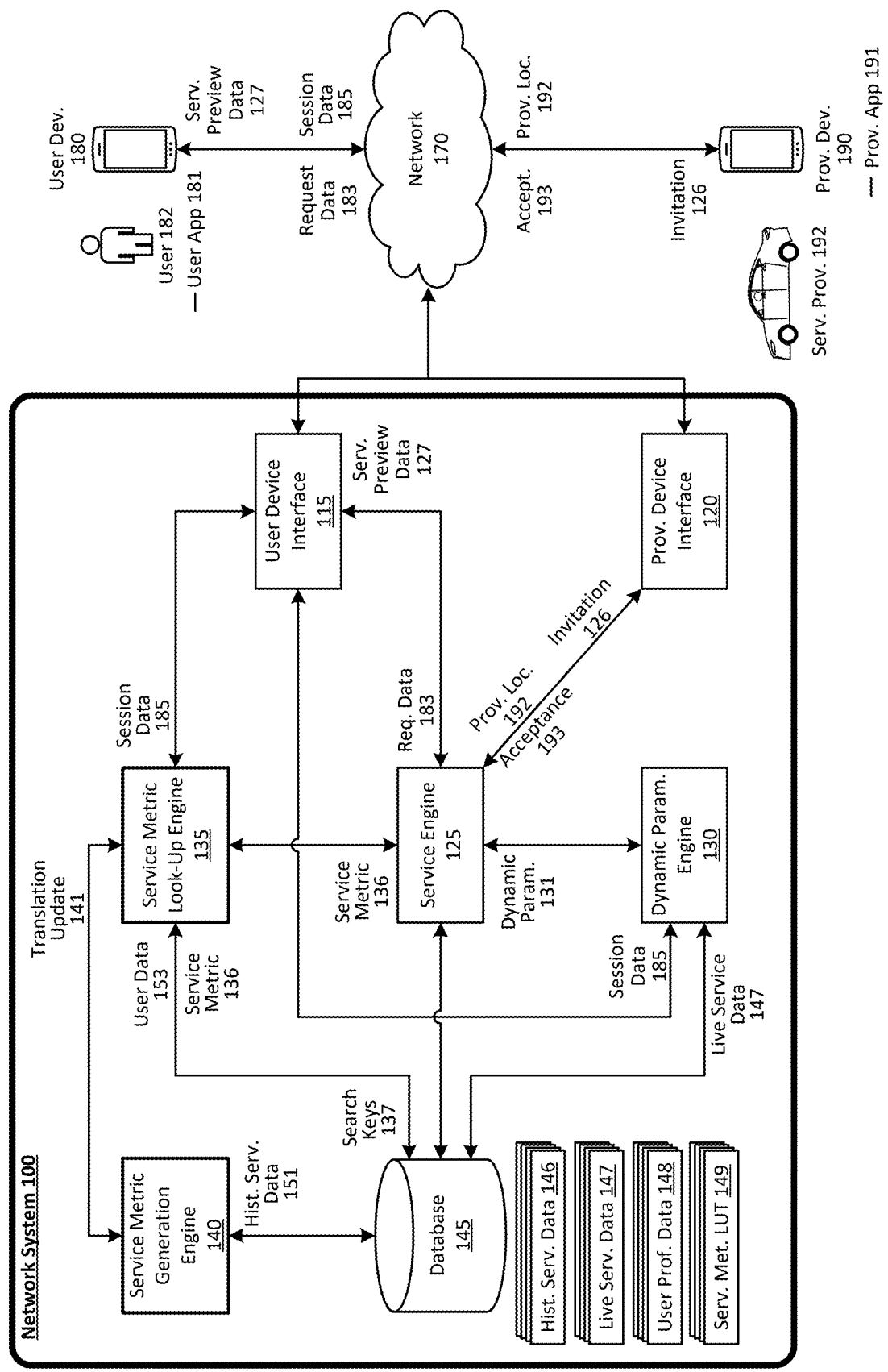
FIG. 1 is a block diagram illustrating an example network system in communication with user devices and provider devices, in accordance with examples described herein.

A network system is provided herein that manages a network-based service (e.g., a transport service, a delivery service, etc.) linking available service providers (e.g., drivers and/or autonomous vehicles (AVs)) with requesting users (e.g., riders, service requesters) throughout a given region (e.g., San Francisco Bay Area). In doing so, the network system can receive requests for service from requesting users via a designated user application executing on the users' mobile computing devices ("user devices"). Based on a start location (e.g., a pick-up location where a service provider is to rendezvous with the requesting user), the network system can identify an available service provider and transmit an invitation to a mobile computing device of the identified service provider ("provider device"). Should the identified service provider accept the invitation, the network system can transmit directions to the provider device to enable the service provider to navigate to the start location and subsequently from the start location to a service location (e.g., a drop-off location where the service provider is to complete the requested service). The start location can be specified in the request and can be determined from a user input or from one or more geo-aware resources on the user device. The service location can also be specified in the request.

In determining an optimal service provider to fulfill a given service request, the network system can identify a plurality of candidate service providers to service the service request based on a start location indicated in the service request. For example, the network system can determine a geo-fence surrounding the start location (or a geo-fence defined by a radius away from the start location), identify a set of candidate service providers (e.g., twenty or thirty service providers within the geo-fence), and select an optimal service provider (e.g., closest service provider to the start location, service provider with the shortest estimated travel time from the start location, service provider traveling or en-route to a location within a specified distance or specified travel time to a service location, etc.) from the candidate service providers to service the service request. In many examples, the service providers can either accept or decline the invitation based on, for example, the route being too long or impractical for the service provider.

In certain implementations, the user application allows a user to preview aspects of the network-based service prior to submitting a service request. For instance, in the context of an on-demand transport service, the user can enter a start location and a service location to preview the expected cost of the network-based service, the estimated time of arrival at the service location, and the like. By interacting with the user application, the user can preview aspects of different service types or classes including, for example, an economy service class, a rideshare pooling service class, a limousine service class, etc. In more detail, during these interactions to preview the network-based service, the user device can transmit to the network system session data that indicates the desired start and service locations. The network system can then compute and determine various aspects of the network-based service based on the received session data. Data is then transmitted from the network system to the user device to enable the user device to render and display graphics and text to allow the user to preview the network-based service. The user can then interact with the user application to submit a service request to cause the network system to identify an optimal service provider to fulfill the requested service. Parameters and variables determined by the network system in response to the session data to preview the service can be applied to the service requested by the user.

In response to the service request, the network system can determine a service parameter (e.g., a cost for the requested service) that is to be applied to prospective service request. The service parameter can be determined based on a dynamic parameter (e.g., a dynamically-determined cost that is determined based on live, real-time data) and a service metric. The dynamic parameter can be computed dynamically based on live data (e.g., a number of nearby service providers, a number of nearby users, etc.) associated with the network-based service. In some implementations, the service metric can be a maximum value for the service parameter. Thus, if the dynamic parameter exceeds the service metric, the service metric will be set as the service parameter for the prospective service request.

Instead of computing both the dynamic parameter and the service metric dynamically, the network system can offload the computations of the service metric such that it is pre-computed and retrieved in real-time in response to receiving the service request from the user device. The service metrics can be pre-computed based on historical data associated with the network-based service. As used herein, pre-computing a service metric can mean computing a service metric prior to receiving a set of session data such that the computed service metric can be stored in a searchable database and retrieved in response to receiving a set of session data from a user device.

According to embodiments, the geographic region can be divided into a plurality of subregions for purposes of managing the network-based service within the geographic region. In some implementations, service parameters for a given service request can be dynamically determined based on, for example, numbers of available service providers and active users within the same subregion (or within neighboring subregions) as the start location indicated in the service request. A plurality of clusters of subregions can also be defined for pre-computations of the service metrics. For example, a cluster of subregions can include a number of geographic subregions. And the pre-computation of the service metric can be made at the cluster level. For instance, a corresponding service metric can be pre-computed for each pair of clusters. As a simple example, a geographic region can include three clusters of geographic subregions—clusters A, B, and C. A service metric can be computed for each combination of subregion clusters (e.g., clusters A and A, clusters A and B, clusters A and C, clusters B and B, clusters B and C, and clusters C and C). Thus, for instance, in response to session data indicating a start location within cluster A and a service location within cluster B, the network system can query the searchable database to retrieve the service metric defined for the combination of clusters A and B. In some variations, the pre-computations of service metrics can be dependent on the direction of desired travel. Thus, different service metrics can be pre-computed for desired travel from cluster A to cluster B as for desired travel from cluster B to cluster A. In other variations, the pre-computed service metrics can be direction-agnostic.

According to embodiments, each of the service metrics can be pre-computed based on historical data associated with the network-based service. Each service metric can be associated with two subregion clusters and, as described herein, searched and retrieved from the database using the identifiers of its associated subregion clusters. The historical data used to pre-compute a given service metric associated with a first subregion cluster and a subregion cluster can be data associated with past instances of the network-based service rendered between the first and second subregion clusters. Using the example above of three subregion clusters (A, B, and C), the service metric associated with clusters A and B can be computed based on past instances of the network-based service fulfilled between the subregion cluster A and subregion cluster B (e.g., instances of the network-based service having a start location within subregion cluster A and service location in B, and/or vice versa) during a given period of time. In addition, the service metric can be a statistical measure of a quantifiable aspect of the past instances of the network-based service. For instance, the service metric associated with subregion clusters A and B can be the eightieth percentile value of costs paid by users for past instances of the network-based service between subregion clusters A and B. In this example, the use of the service metric can guarantee that the requesting user will be quoted a maximum of the 80% percentile value of the historical costs paid in the past by users for the network-based service between subregion clusters A and B when previewing the network-based service between those subregion clusters. Thus, in this example, in times of peak demand (e.g., during rush hour) where dynamically-determined costs are typically high, users can expect to pay no more than the 80% percentile value for this service. Other statistical measures can be utilized. For instance, the mean value or a value corresponding to a number of standard deviations from the mean value can also be used. In addition, different statistical measures may be used for different geographic regions or even for different subregion cluster pairs within the same geographic region.

In one aspect, the service metrics are maintained in a searchable database and can be queried by the network system in response to received session data. The relevant service metric in response to the session data can be queried based on a start location and a service location indicated in the session data using a two-step translation process whereby the start and service locations are translated to two search keys. The database can then be queried in real-time using the two search keys to retrieve the relevant service metric. In more detail, the start location and the service location can each be geographic coordinates (e.g., longitude and latitude) and can be first converted to two intermediate identifiers. The start location can be converted to a first intermediate identifier that identifies a first subregion in which the start location is located. The first intermediate identifier can then be converted to a first search key. The first search key can be the identifier of a first subregion cluster that includes the first subregion. Similarly, the service location can be converted to a second intermediate identifier that identifies a second subregion in which the service location is located. And the second intermediate identifier can be converted to a second search key that identifies a second subregion cluster that includes the second subregion. The first and second search keys can be used to query the database in real time to retrieve the relevant service metric in response to the received session data. This two-step translation process ensures that the clusters of subregions can be dynamically changed without affecting the process to query the database for the service metrics.

In some implementations, the clusters of subregions can be defined or determined based on the amount of historical data (e.g., number of past instances of the network-based service rendered) available for the computations of the service metric. In the above example of three subregion clusters (A, B, and C), cluster A can include more geographic subregions compared with clusters B and C because they correspond to regions of lower demand for or requests of the network-based service. As demand and usage trends change, the clusters can be redefined. Based on the redefined clusters, the translations from geographic cluster identifier (e.g., an intermediate identifier) to the database search keys (e.g., identifier for the redefined subregion cluster) can be modified. In this manner, the network system can be configured to continuously monitor data collected for past instances of the network-based service to determine whether to redefine some or all of the subregion clusters in the geographic region managed by the network system. In response to such a determination, the network system can redefine some or all of the subregion clusters within the geographic region and the corresponding translations. As described herein, the two-step translation process to translate geographic locations to database search keys enables the clusters to be redefined without significant changes to the translation process.

In certain implementations, whether the service parameter determination is based on a corresponding service metric (e.g., as a cap for the service parameter) can be based on the user and/or the start and service locations. In responding to a set of session data, the network system can first determine whether the service metric for the requested route is applicable to the requesting user. If the service metric applies for the requesting user for the requested route, the service metric can be queried from the database and the determination of the service parameter can be based on the retrieved service metric (e.g., as a cap for the service parameter). If the service metric does not apply for the requesting user for the requested route, the network system does not need to retrieve the service metric and simply determines the dynamic parameter as the service parameter. In one variation, a subset of the users of the network-based service can be associated with a package or product that caps the service parameter. Certain users of the network-based service can purchase a time-limited subscription package or product that caps the service parameter for a particular route. For example, a user can purchase a 30-day subscription package for capped fares between a first location (e.g., the user's home address) and a second location (e.g., the user's work address). In this example, any time the user requests service between the first and second locations, a corresponding service metric can be retrieved, and the service parameter can be determined based on the corresponding service metric. When the user requests service between to or from other locations, the network system can determine that no service metric is applicable to the user and the service parameter determined irrespective of any service metrics (e.g., the cost can be uncapped). As another example, the user can purchase a 10-day subscription or 10-use package for capped fares within certain areas of the geographic region (e.g., within San Francisco city limits, within Manhattan, etc.).

Among other benefits, embodiments described herein provide for a method and system to efficiently provide service metrics in response to session data received from a user device. By pre-computing the service metrics and maintaining them in a searchable database or lookup-table (LUT), the network system can retain the same functionalities as a conventional system while avoiding the performance of computationally-heavy tasks in real-time when responding to session data and service requests from users. During times of peak demand, when the network system is processing the highest numbers of requests from users, pre-computing the service metrics can significantly reduce the amount of computing power needed to maintain a steady and acceptable user experience (e.g., delays due to computational latencies). In addition, the two-step translation process to translate geographic locations (e.g., geographic coordinates) to database search keys (e.g., cluster identifiers) provides ensures that not only can the query for service metrics be performed in real-time in response to session data from users, but that the translation process is flexible enough such that the clusters can be redefined in response to altered usage or demand patterns. From a user experience perspective, examples described herein provide for a more consistent user experience in previewing, requesting, and utilizing the network-based service. In the context of the service parameter being an estimated cost of the network-based service and the service metric being a cap on the service parameter, the user can expect more consistency or less variations in the dynamically-computed cost of requesting the network-based service due to factors such as real-time demand.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block diagram illustrating an example network system in communication with user devices and provider devices, in accordance with examples described herein. Network system 100 can implement or manage a network-based service (e.g., an on-demand transport service, an on-demand delivery service, etc.) that connects requesting users 182 with service providers 192 that are available to fulfill the users' service requests 183. The network system 100 can provide a platform that enables on-demand services to be provided by an available service provider 192 for a requesting user 182 by way of a user application 181 executing on the user devices 180, and a provider application 191 executing on the provider devices 190. As used herein, a user device 180 and a provider device 190 can comprise a computing device with functionality to execute a designated application corresponding to the on-demand service managed by the network system 100. In many examples, the user device 180 and the provider device 190 can comprise mobile computing devices, such as smartphones, tablet computers, VR or AR headsets, on-board computing systems of vehicles, smart watches, and the like. In one example, a service provider fulfilling a service request includes the service provider rendezvousing with the user at start location (e.g., a pick-up location) to pick up the user and transporting the user to a service location (e.g., a destination location).

The network system 100 can include a user device interface 115 to communicate with user devices 180 over one or more networks 170 via the user application 181. According to examples, a requesting user 182 wishing to utilize the network-based service can launch the user application 181 and can cause user device 180 to transmit, by using the user application 181, a service request 183 over the network 170 to the network system 100. In certain implementations, the requesting user 182 can view multiple different service types managed by the network system 100. In the context of an on-demand transport service, service types can include a ride-share service, an economy service, a luxury service, a professional service provider service (e.g., where the service provider is certified), a self-driving vehicle service, and the like. In certain implementations, the available service types can include a rideshare-pooling service class in which multiple users can be matched to be serviced by a service provider. The user application 181 can enable the user 182 to scroll through the available service types. The user application 181 can also enable the user 182 to enter the start and service locations for a prospective service request. In some examples, the user device 180 can automatically determine the start location based on the current location of the user 182 (e.g., as determined by on-board location-aware resources).

In one aspect, session data 185 can be generated by the user device 180 in response to the user entering the start and service locations within the user application 181 to preview aspects of the network-based service prior to submitting the service request 183. The session data 185 can indicate the start and service locations. In response to receiving the session data 185, the network system 100 can determine a dynamic parameter 131 and a service metric for the session (service metric 136), in order to determine a service parameter in response to the session data 185. Thereafter, the network system 100 can generate and transmit to the user device 180 service preview data 127 that indicates various aspects of the network-based service (e.g., estimated cost, ETA of service provider at start location, ETA to service location, locations of nearby service providers, etc.) for each of the available service types. The service preview data 127 can cause the user application 181 to display such information on the user device 180. As the user scrolls through the available service types, the user interface can update to show visual representations of service providers for that service type on a map centered around the user 182 or the start location set by the user. The user 182 can interact with the user interface of the user application 181 to select a particular service type and transmit the service request 183.

According to embodiments, the session data 185 can be received by a service metric look-up engine (SMLUE) 135 of the network system 100. In certain implementations, the SMLUE 135 can first determine whether a service metric should be retrieved in response to the session data 185. This determination can be based on the user or profile data associated with the user. For example, the user can be associated with or assigned a package or a product for capped costs for the network-based service between two locations. Thus, in response to the session data 185, the SMLUE 135 can retrieve user data 153 from a database 145 to determine whether to apply a service metric in response to the received session data 185. The database 145 can store user profile data 148 for each of the users of the network-based service, including any capped-cost subscriptions attached to the user 182's profile. The determination can also be based on the start and service locations indicated in the session data 185. As an example, the user 182 can be associated with a capped-cost subscription for service between his or her home and work locations. In this example, in response to receiving the session data 185 indicating that service is desired between other locations, the SMLUE 135 can determine a service metric is not applicable for the session. If the SMLUE 135 determines, based on the user and/or the start and service locations, that a service metric applies for the received session data 185, the SMLUE 135 can query a searchable database (e.g., database 145) to retrieve the service metric for the session.

According to embodiments, the SMLUE 135 can query the service metric 136 for the session based on the start and/or service locations indicated in the session data 185. A service metric LUT 149 be maintained in the database 145 and can store all the service metrics that are pre-computed for the network-based service in the geographic region managed by the network system 100. The service metric LUT 149 can be queried using the search keys 137. To query the service metric 136 for the session from the service metric LUT 149, the SMLUE 135 can translate the start and service locations to search keys 137.

In one example, the SMLUE 135 can translate the start and service locations to search keys 137 using a two-step translation process. The start and service locations can each be a set of geographic coordinates (e.g., longitude and latitude coordinates). The geographic region in which the network-based service is managed by the network system 100 can be divided into geographic subregions. Subsets of neighboring or nearby geographic subregions can be grouped together as subregion clusters. The start location can be converted to a first intermediate identifier that identifies a first geographic subregion in which the start location is located. The first intermediate identifier can then be converted to a first search key. The first search key can be an identifier that identifies the subregion cluster that includes the first geographic subregion. The service location can be converted to a second intermediate identifier that identifies a second geographic subregion in which the service location is located. The second intermediate identifier can then be converted to a second search key. The second search key can be an identifier that identifies the subregion cluster that includes the second geographic subregion. The first search key and the second search key can comprise the search keys 137. Using the search keys 137, service metric 136 for the session can be retrieved from the service metric LUT 149.

In the examples described herein, the network system 100 can include a dynamic parameter engine 130 that can generate a dynamic parameter 131 in response to the session data 185. In certain implementations, the dynamic parameter 131 can represent a dynamically-determined cost for the user 182 if the user proceeds to request the network-based service. The dynamic parameter engine 130 can retrieve live service data 147 from the database 145 to determine the dynamic parameter 131. The dynamic parameter 131 can be determined based on, for example, a current level of demand and a current level of supply of the network-based service in the vicinity of the start location specified in the session data 185. For example, the dynamic parameter engine 130 can determine the dynamic parameter 131 based on a number of active users (e.g., users actively interacting with the user application executing on their devices) and/or a number of service providers in the same geographic subregion or the same subregion cluster as the start location.

According to embodiments, the network system 100 can include a service engine 125 that can perform a number of functions in response to receiving the session data 185 and request data 183 from the user device 180. In one aspect, in response to the session data 185, the service engine 125 can determine a service parameter for the session. The service parameter can be used to generate service preview data 127 to be transmitted to the user device 180. In some implementations, the service parameter can be an estimated cost if the user proceeds to request the network-based service by causing the user device 180 to transmit the request data 183. In response to receiving the service preview data 127, the user application 181 can cause the user device 180 to display content to enable the user 182 to view available options for the network-based service, including estimated costs for requesting the network-based service (e.g., the service parameter). The service engine 125 can determine the service parameter based on the queried service metric data 136 and the dynamically-generated dynamic parameter 131. For example, if a service metric is determined to be applicable for the session, the value for the service parameter can be based on the dynamic parameter 131 but capped at the queried service metric 136. If no service metric is determined to be applicable for the session (e.g., based on the user and/or the start and service locations), the service parameter can be uncapped and based on the dynamic parameter 131.

In another aspect of the service engine 125, in response to receiving the service request 183, the service engine 125 can identify a candidate service provider 192 to fulfill the service request 183. The service engine 125 can receive provider location data 194 transmitted from the provider devices 190 to identify an optimal service provider 192 to service the user's service request 183. The optimal service provider 192 can be identified based on the service provider 192's location, ETA to the start location, status, availability, and the like. The service engine 125 can transmit an invitation 126 to the provider device 190 of the selected service provider 192. The invitation 126 can be transmitted over the network 170 via a provider device interface 120 that communicates with provider devices 190. In response to receiving the invitation 126, the provider application 191 can display a prompt for the service provider 192 to accept or decline the invitation 126. Should the service provider 192 accept the invitation 126, the provider application 191 can cause the provider device 190 to transmit an acceptance 193 to the network system 100. In response to receiving the acceptance 193 from the provider device 190, the network system 100 and the service engine 125 can perform a number of operations to facilitate the fulfillment of the requested service by the service provider 192. As an example, the service engine 125 generate an optimal route 127 for the service provider 192 to fulfilling the service request 183. The route 127 can be generated based on map data 147 stored within a database 145. The route 127 can include a segment from the current location of the service provider 192 (e.g., based on the provider location data 194) to the start location and another segment from the start location to the service location. The route 127 can also include other intermediate locations such as a drop-off location for another user of a ride-share transport service, etc. The provider device interface 120 can transmit the route 127 to the provider device 190 via the one or more networks 170. The provider device 190 can display, via the provider application 191, turn-by-turn directions for the service provider 192 based on the route 127 generated by the service engine 125. In some implementations, the service engine 125 can transmit the start and service locations to the service provider device 190 and the provider devices 190 and the provider application 191 can generate one or more routes and turn-by-turn directions for the service provider 192 necessary to fulfill the service request 183.

In various examples, the network system 100 can maintain user data for the requesting user 182 in the database 145 in the form of user profile data 146. The user profile data 146 can include information relating to services requested by the user 182 in the past, frequently visited locations associated with the network-based service (e.g., home location, office address, etc.), and the like. The user profile data 146 can also include payment information (e.g., credit/debit card information, etc.) used by the network system 100 to process the user 182's payments for the network-based service. In some implementations, the user 182 can enter payment information via the user application 191. For instance, the user 182 can be prompted, either while setting up a user account or profile for the network-based service or before submitting a request for service.

In certain implementations, the network system 100 further includes a service metric generation engine 140 to pre-computer service metrics to populate the service metric LUT 149. The service metric generation engine 140 can generate the service metrics based on historical service data 146 maintained by the database 145. The historical service data 146 used to pre-compute a given service metric associated with a first subregion cluster and a subregion cluster can be data associated with past instances of the network-based service rendered between the first and second subregion clusters. The service metric can be a statistical measure (e.g., an eightieth percentile value, a standard deviation above or below the mean value, etc.) of a quantifiable aspect of the past instances of the network-based service. After the service metrics are computed and stored in the service metric LUT 149 maintained by the database 145, the service metric generation engine 140 can update the service metrics stored in the service metric LUT 149 using more up-to-date historical service data 146. The service metric generation engine 140 can further update one or more of the subregion clusters defined for the geographic region managed by the network system 100. For example, based on the historical service data 146, the service metric generation engine 140 can determine to update the subregions contained in one or more of the subregion clusters. In updating one or more of the subregion clusters, the service metric generation engine 140 can also transmit translation updates 141 to the SMLUE 135 to cause the SMLUE 135 to update the translation tables and caches used to translate locations to search keys.

Methodology

Figure 2A:
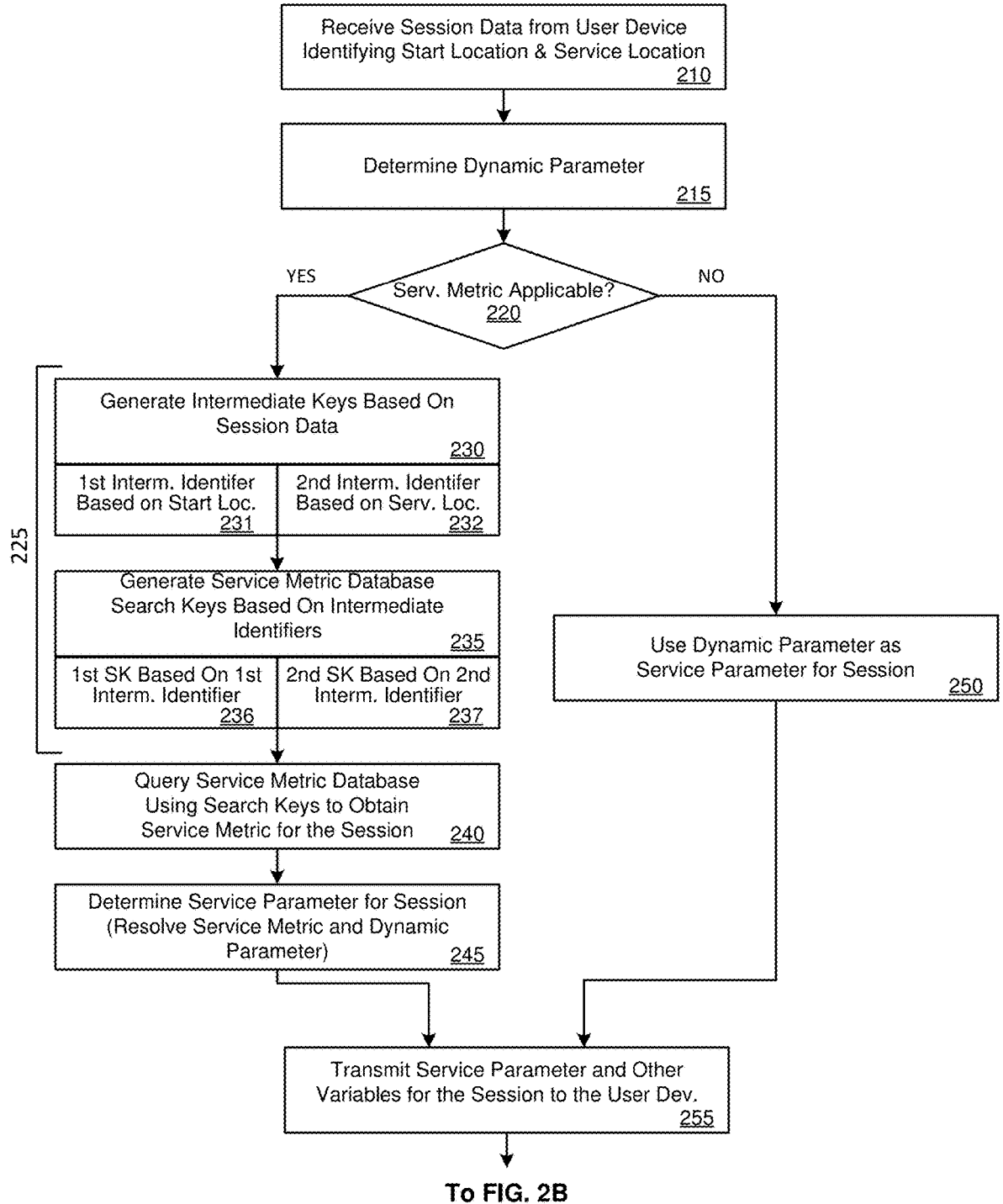
FIGS. 2A and 2B are flow charts illustrating an example method of processing a set of session data and a set of request data received from a user device, in accordance with examples described herein.
Figure 2B:
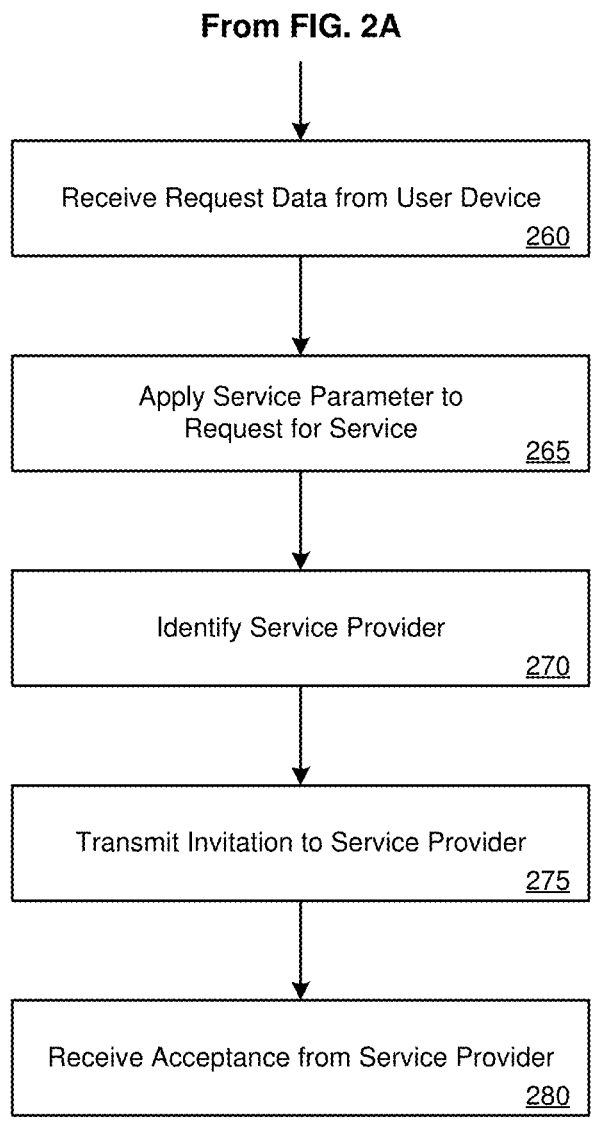

FIGS. 2A and 2B are flow charts illustrating an example method of processing a set of session data and a set of request data received from a user device, in accordance with examples described herein. In the below description of FIGS. 2A and 2B, references may be made with respect to FIG. 1. For instance, the example method illustrated in FIGS. 2A and 2B can be performed by an exemplary network system 100 illustrated in and described with respect to FIG. 1.

Referring to FIG. 2A, the network system can receive session data from a user device executing a user application (210). The session data can be generated by the user device in response to the user interacting with the user application to preview options and content for the network-based service prior to submitting a service request. The session data can be generated in response to, for example, the user opening the user application on the user device, the user entering a start location and/or a service location, etc. The start location can also be determined using one or more geo-aware resources (e.g., a GPS receiver) of the user device. The session data can indicate the start and service locations.

The network system can determine a dynamic parameter in response to receiving the session data (215). The dynamic parameter can be determined based on real-time data associated with the network-based service. For instance, the dynamic parameter can be determined based on a real-time measure of supply and demand of the network-based service near the start or service location indicated in the session data. As one example, the dynamic parameter can be determined based on a real-time number of active users (e.g., users actively interacting with the user application executing on their respective user devices) or available service providers located near the start or service locations (e.g., within a certain distance, in the same geographic subregion, in the same subregion cluster, etc.). In some embodiments, step 215 can be performed in parallel or contemporaneously with one or more of steps 220 to 245.

In response to the session data, the network system can further determine whether a service metric is applicable to the session (220). This determination can be performed based on the user and/or the start and service locations. The network system can retrieve user profile data associated with the requesting user to determine whether the service metric is applicable to the user. In one variation, the network system can determine whether the service metric is applicable for the session based on the user's identity. That is, some users can be associated with the use of service metrics in determining their service parameters while other users may not. In addition, the determination of whether the service metric is applicable for the session can be based on the start and service location. In one example, the user can have purchased or be assigned a consistent cost package guaranteeing capped costs between two specific locations. Thus, if the user previews the network-based service between the two specific locations, the service metric is applicable. Otherwise, for other instances of the network-based service between other locations, no service metric is applicable to the user.

If the network system determines that a service metric is applicable for the session, the network system can retrieve the appropriate pre-computed service metric using the session data. The network system can perform a two-step translation process to generate search keys to query the service metric database (225). The network system can do so by first generating two intermediate identifiers based on the session data (230). The network system and can translate the start location to a first intermediate identifier (231). The first intermediate identifier can identify a first geographic sub-region in which the start location is located. The network system can access a cache or lookup table to quickly perform this translation. The network system can also translate the service location to a second intermediate identifier (232). The second intermediate identifier can identify a second geographic sub-region in which the service location is located. Thereafter, the network system can generate service metric database search keys based on the intermediate identifiers (235). The network system can translate the first intermediate identifier to a first search key (236). The first search key can be an identifier for a first subregion cluster that includes the first geographic subregion. The network system can also translate the second intermediate identifier to a second search key (237). The second search key can be an identifier for a second subregion cluster that includes a second geographic subregion.

The network system can query the service metric database for the appropriate service metric for the session using the search keys translated from the start and service locations (240). The network system can then determine the service parameter for the session based on the service metric retrieved for the session and the dynamic parameter determined for the session (245). In one implementation, the network system can resolve the service metric and the dynamic parameter to generate the service parameter. The service parameter can be based on the dynamic parameter but be capped at the value of the service metric.

If the network system determines that no service parameters are applicable to the session, the network system can use the dynamic parameter as the service parameter (250). In this case, the service parameter is not capped by any relevant service metrics. The network system can transmit the service parameter and other variables relevant to the session to the user device (255). In response, the user application can cause the user device to display content based on the service parameter. For instance, the user device can display content conveying information regarding the expected (or locked-in) cost for the network-based service from the start location to the service location should the user submit the service request. The user device can also display information such as an ETA of the service provider at the start location, an ETA of the user at the service location, and the like. In addition, information pertaining to multiple classes of service (e.g., an economy service, a luxury service, a rideshare pooling service, etc.) can be displayed on the user device. Different applicable service metrics can be retrieved for the multiple classes of service. In some instances, service metrics may be applicable to only a single class of service. In other cases, different service metrics may be applicable to two or more of multiple classes of service. After transmitting the service parameter and other variables for the session to the user device, the network system can await a service request from the user device (depicted in FIG. 2B).

Referring to FIG. 2B, the network system can receive a request data corresponding to a service request from the user device (260). If the request data indicates start and service locations that match those indicated in the session data received at step 210 (FIG. 2A), the service parameter determined at steps 245 or 250 can be applied for the instance of the network-based service resulting from the user's request (265). In addition, the network system can identify an optimal service provider to fulfill the requested service (270). The optimal service provider can be identified based on the location of the service provider relative to the start location, ETA of the service provider to the start location, the service provider's availability, the service provider's class of service, and the like. The network system can transmit an invitation to the identified service provider (275). At step 280, the network system receives an acceptance from the identified service provider in response to the invitation transmitted at step 275.

User Interface

Figure 3A:
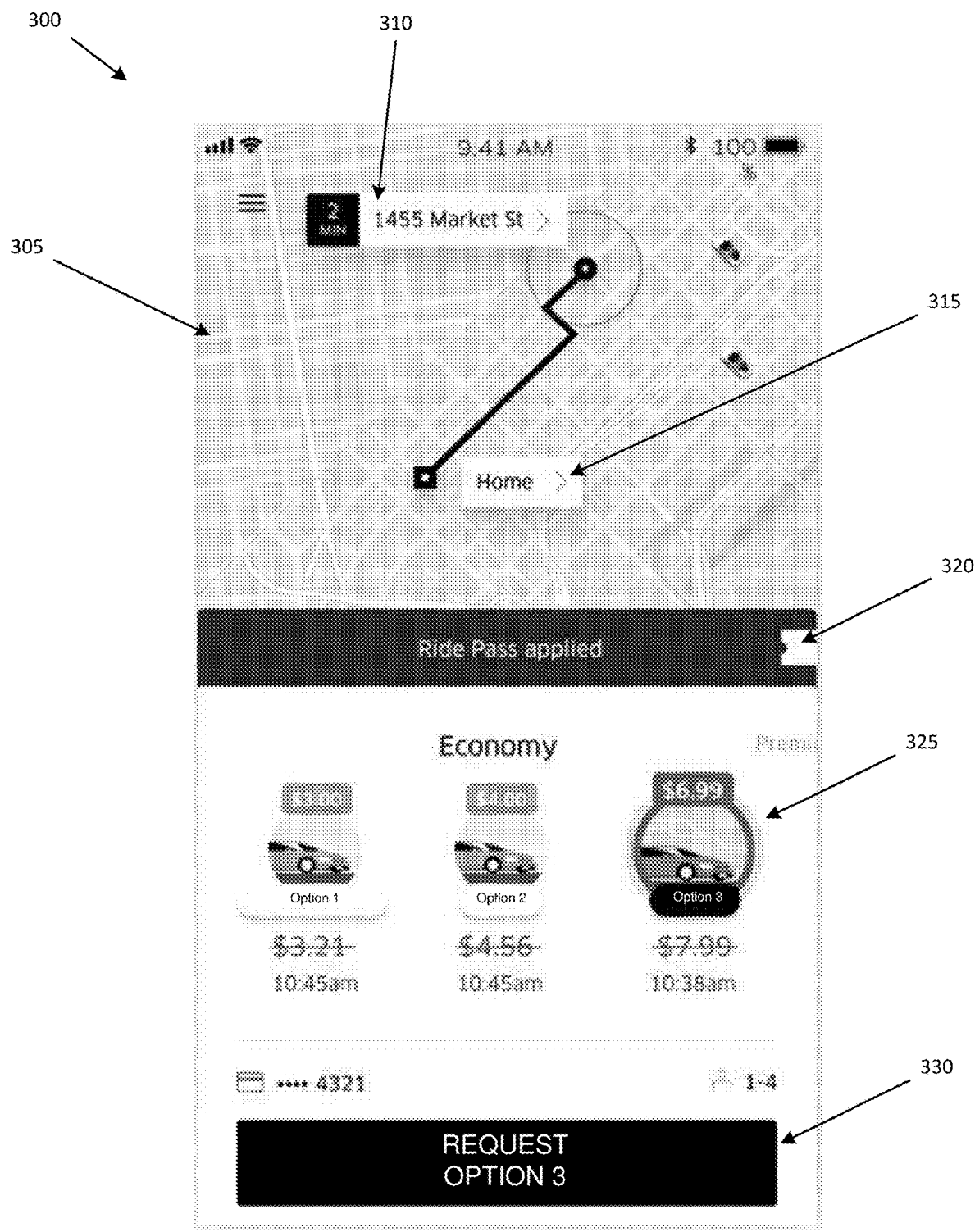
FIGS. 3A and 3B are figures illustrating example user interfaces for a user application executing on a user device, in accordance with examples described herein.
Figure 3B:
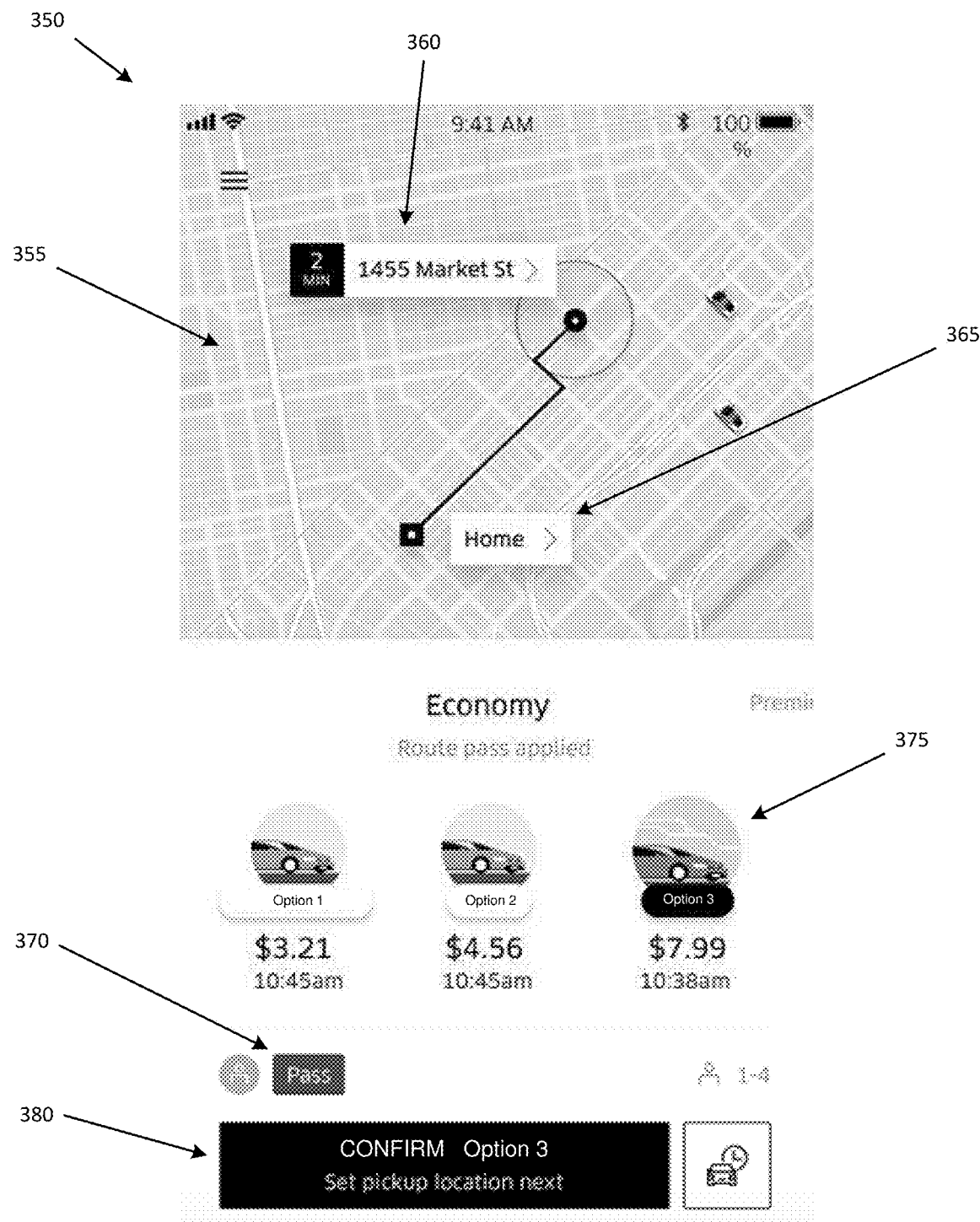

FIGS. 3A and 3B are figures illustrating example user interfaces for a user application executing on a user device, in accordance with examples described herein. In the below description of FIGS. 3A and 3B, references may be made with respect to FIGS. 1 and 2. In particular, the example user interface illustrated in FIGS. 3A-B can be displayed by user device 180 of FIG. 1 in previewing and requesting a network-based service.

Referring to FIG. 3A, the user application can display user interface 300 in response to receiving content data (e.g., service preview data 127 of FIG. 1) from the network system. The user can interact with the user application to enter a start location and a service location. In response, the user device can transmit to the network system a set of session data that indicates the start location and the service location. In response, the network system can generate content data to cause the user interface to display the user interface 300.

The user interface 300 includes a map feature 305 that displays the start location 310 and the service location 315. The map feature 305 also displays a route from the start location to the service location. In addition, the map feature 305 can also include an ETA of a service provider to the start location ("2 MIN").

The user interface 300 can further include an indication 320 that a cost-capping feature has been applied for the session of the user. In particular, indication 320 is displayed as a banner with the text "Ride Pass applied." The indication 320 can be selectively displayed based on the determination of whether any service metrics is applicable to the session for the user (e.g., step 220 of FIG. 2A). If the network system determines that a service metric is applicable based on the user and/or the start and service locations, the content data transmitted to the user device can cause the user device to display the indication 320.

The user interface 300 can also display preview information 325 for a plurality of service classes. For each service class, the preview information 325 can include an estimated cost (e.g., "$6.99" for "Option 3"). As described herein, the estimated cost can be a service parameter determined by the network system in response to the session data, and, in the event that a cost-capping feature has been applied for the session, the estimated cost can be dependent on a pre-computed service metric. The preview information 325 can further display the estimated cost of the service without the cost-capping feature being applied so that the user can visualize the amount of cost savings associated with the cost-capping feature. Furthermore, the preview information 325 can include respective ETAs at the service location for each of the different classes of service. The user interface 300 can further include a feature 330 for submitting a service request for the selected class of service.

Referring to FIG. 3B, the user interface 350, like user interface 300, includes a map feature 355 that displays the start location 360 and the service location 365. The map feature 355 also displays a route from the start location to the service location. In addition, the map feature 355 can also include an ETA of a service provider to the start location ("2 MIN").

The user interface 350 can further include an indication 370 that a cost-capping feature has been applied for the session of the user. In particular, indication 370 is displayed as an icon with the text "Pass" to indicate that a cost-capping feature has been applied for the session. The indication 370 can be selectively displayed based on the determination of whether any service metrics is applicable to the session for the user (e.g., step 220 of FIG. 2A). If the network system determines that a service metric is applicable based on the user and/or the start and service locations, the content data transmitted to the user device can cause the user device to display the indication 370.

The user interface 300 can also display preview information 375 for a plurality of service classes. For each service class, the preview information 375 can include an estimated cost (e.g., "$7.99" for "Option 3"). As described herein, the estimated cost can be a service parameter determined by the network system in response to the session data, and, in the event that a cost-capping feature has been applied for the session, the estimated cost can be dependent on a pre-computed service metric. Furthermore, the preview information 375 can include respective ETAs at the service location for each of the different classes of service. The user interface 350 can further include a feature 380 for submitting a service request for the selected class of service.

Hardware Diagrams

Figure 4:
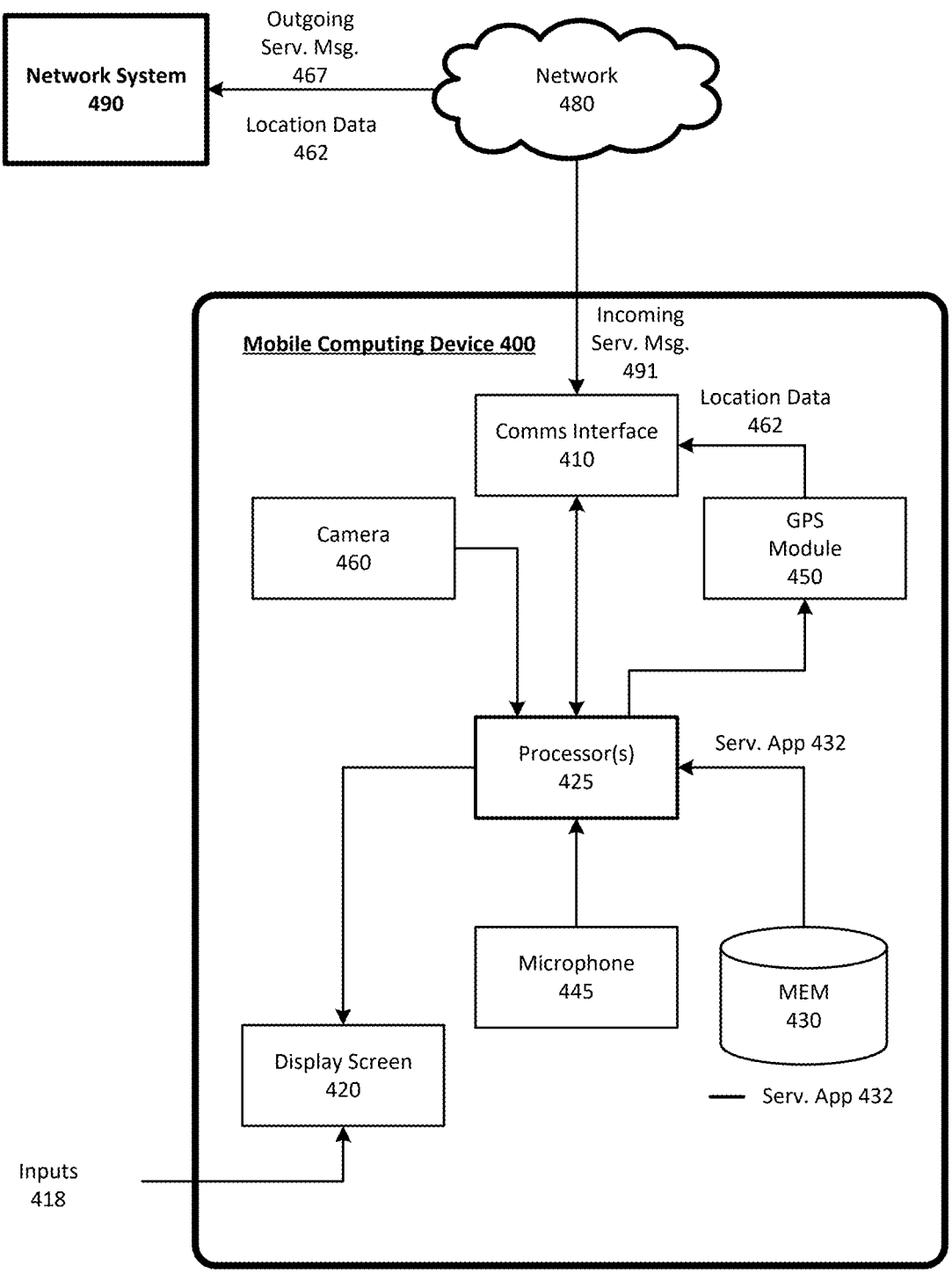
FIG. 4 is a block diagram illustrating an example mobile computing device, in accordance with examples described herein.

FIG. 4 is a block diagram illustrating an example mobile computing device, in accordance with examples described herein. In many implementations, the mobile computing device 400 can be a smartphone, tablet computer, laptop computer, VR or AR headset device, and the like. In the context of FIG. 1, the user device 180 and/or the provider device 190 may be implemented using a mobile computing device 400 as illustrated in and described with respect to FIG. 4.

According to embodiments, the mobile computing device 400 can include typical telephony features such as a microphone 470, a camera 440, and a communication interface 410 to communicate with external entities (e.g., network system 490 implementing or managing the network-based service) using any number of wireless communication protocols. The mobile computing device 400 can store a designated application (e.g., a service application 432) in a local memory 430. The service application 432 can correspond to one or more user applications for implementations of the mobile computing device 400 as user devices for the network-based service. The service application 432 can also correspond to one or more provider applications for implementations of the mobile computing device 400 as provider devices for the network-based service.

In response to an input 418, the processor can execute the service application 432, which can cause an application interface 442 to be generated on a display screen 420 of the mobile computing device 400. In implementations of the mobile computing device 400 as user devices, the application interface 442 can enable a user to, for example, request for the network-based service. The request for service can be transmitted to the network system 490 as an outgoing service message 467.

In various examples, the mobile computing device 400 can include a GPS module 460, which can provide location data 462 indicating the current location of the mobile computing device 400 to the network system 490 over a network 480. In some implementations, other location-aware or geolocation resources such as GLONASS, Galileo, or BeiDou can be used instead of or in addition to the GPS module 460. The location data 462 can be used in generating a service request, in the context of the mobile computing device 400 operating as a user device. For instance, the user application can set the current location as indicated by the location data 462 as the default start location (e.g., a location where a selected service provider is to rendezvous with the user).

Figure 5:
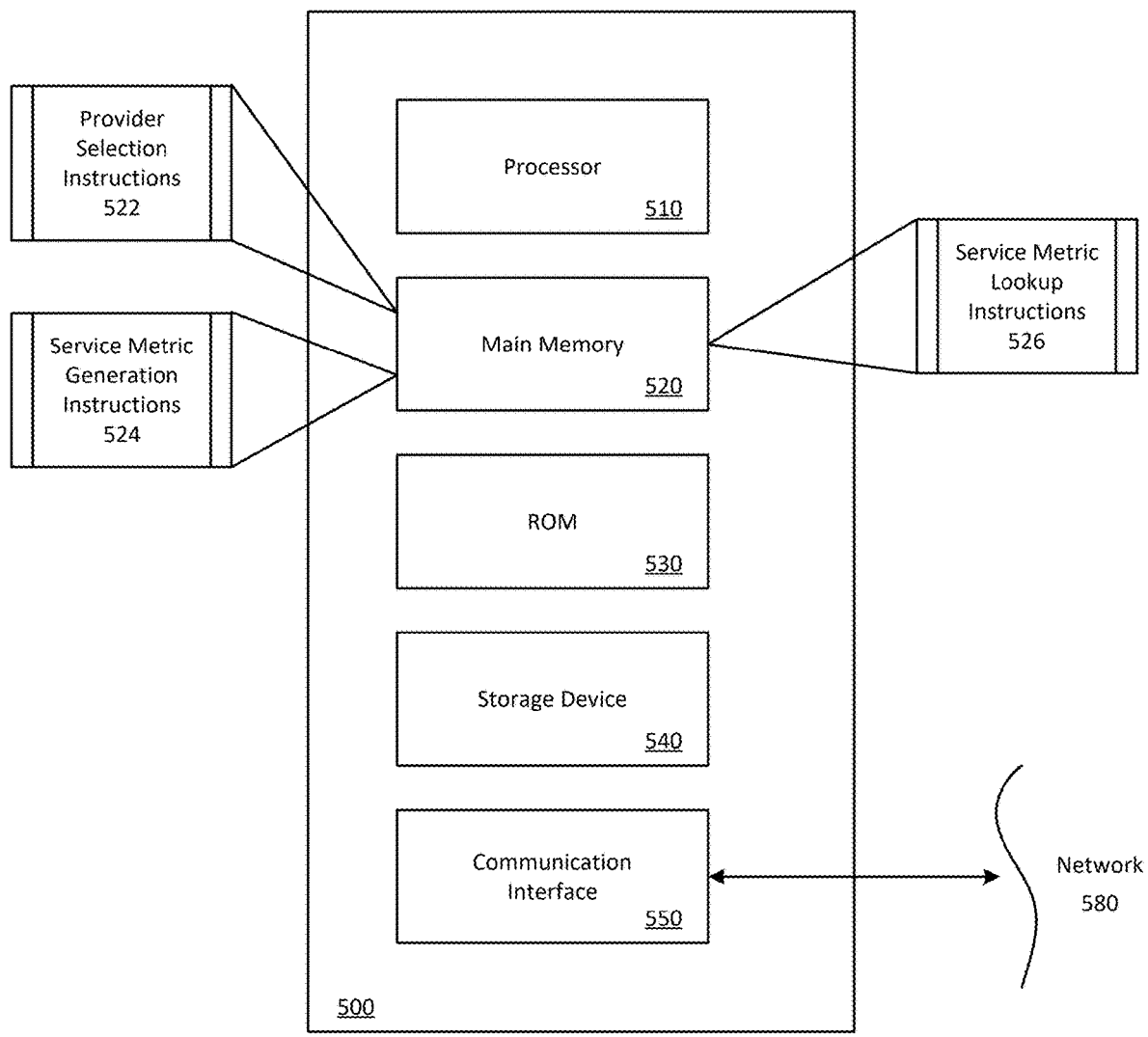
FIG. 5 is a block diagram that illustrates a computer system upon which examples described herein may be implemented.

FIG. 5 is a block diagram that illustrates a computer system upon which examples described herein may be implemented. A computer system 500 can represent, for example, hardware for a server or combination of servers that may be implemented as part of a network service for providing on-demand services. In the context of FIG. 1, the network system 100 may be implemented using a computer system 500 or combination of multiple computer systems 500 as described by FIG. 5.

In one aspect, the computer system 500 includes processing resources (processor 510), a main memory 520, a memory 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the memory 530 or other static storage device for storing static information and instructions for the processor 510. A storage device 540, such as a magnetic disk or optical disk, is provided for storing information and instructions.

The communication interface 550 enables the computer system 500 to communicate with one or more networks 580 (e.g., a cellular network) through use of a network link (wireless or wired). Using the network link, the computer system 500 can communicate with one or more computing devices, one or more servers, and/or one or more self-driving vehicles. In accordance with some examples, the computer system 500 receives service requests from mobile computing devices of individual users. The executable instructions stored in the memory 530 can include provider selection instructions 522, service metric generation instructions 524, and service metric lookup instructions 526 to perform one or more of the methods described herein when executed.

By way of example, the instructions and data stored in the memory 520 can be executed by the processor 510 to implement an example network system 100 of FIG. 1. In performing the operations, the processor 510 can handle service requests and provider statuses and submit service invitations to facilitate fulfilling the service requests. The processor 510 executes instructions for the software and/or other logic to perform one or more processes, steps and other functions described with implementations, such as described by FIGS. 1 through 3A-B.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network system for managing a network-based service within a geographic region, comprising:
   one or more processors; and
   one or more memory resources storing instructions that, when executed by the one or more processors of the network system, cause the network system to:
      determine, based on historical data associated with past instances of the network-based service, a plurality of pre-computed service metrics associated with the network-based service;
      maintain the plurality of pre-computed service metrics in a database;
      in response to receiving, from a user device of a first user of the network-based service, session data associated with the first user, retrieve, using the session data, a first pre-computed service metric from the plurality of pre-computed service metrics maintained in the database by querying the database using a start location and a service location indicated by the session data;
   transmit, to the user device of the first user, a set of data to cause a user application executing on the user device to present a user interface for submitting a request for the network-based service, wherein the user interface displays information relating to the first pre-computed service metric retrieved using the session data associated with the first user; and
   in response to receiving, from the user device, request data corresponding to the request for the network-based service by the first user, associate the first pre-computed service metric with the request.

2. The network system of claim 1, wherein the executed instructions further cause the network system to translate at least one of the start location and the service location to a search key for querying the database for the first pre-computed service metric.

3. The network system of claim 1, wherein the executed instructions further cause the network system to:
   translate the start location and the service location to a first search key and a second search key, respectively; and
   query the database for the first pre-computed service metric using the first search key and the second search key.

4. The network system of claim 1, wherein the executed instructions further cause the network system to:

translate the start location to a first search key for querying the database for the first pre-computed service metric by (i) converting the start location to a first intermediate identifier, and (ii) converting the first intermediate identifier to the first search key; and translate the service location to a second search key for querying the database for the first pre-computed service metric by (i) converting the service location to a second intermediate identifier, and (ii) converting the second intermediate identifier to the second search key.

5. The network system of claim 4:
wherein the first intermediate identifier identifies a first geographic subregion in which the start location is located, and the first search key identifies a first cluster of geographic subregions that includes the first geographic subregion; and
wherein the second intermediate identifier identifies a second geographic subregion in which the service location is located, and the second search key identifies a second cluster of geographic subregions that includes the second geographic subregion.

6. The network system of claim 5, wherein the first pre-computed service metric is associated with the first geographic subregion and the second geographic subregion.

7. The network system of claim 5:
wherein the geographic region comprises a plurality of geographic subregions, including the first geographic subregion and the second geographic subregion; and
wherein the executed instructions further cause the network system to determine, in advance of receiving the session data, a plurality of clusters of geographic subregions for the geographic region that includes the first cluster of geographic subregion and the second cluster of geographic subregion.

8. The network system of claim 7, wherein each of the plurality of service metrics is associated with two clusters of geographic subregions from the plurality of clusters of geographic subregions.

9. The network system of claim 7, wherein the executed instructions further cause the network system to update the determination of the plurality of clusters of geographic subregions for the geographic region.

10. The network system of claim 1:
wherein the executed instructions further cause the network system to determine, in response to receiving the session data, a dynamic parameter based on the session data; and
wherein associating the first pre-computed service metric with the request for the network-based service by the first user comprises determining, based on the dynamic parameter and the first pre-computed service metric, a service parameter for the request for the network-based service by the first user.

11. The network system of claim 1, wherein the first pre-computed service metric corresponds to a fare estimate for fulfillment of the first user's request for the network-based service.

12. The network system of claim 11, wherein the first pre-computed service metric corresponds to a cap for a fare estimate for fulfillment of the first user's request for the network-based service.

13. The network system of claim 1, wherein the executed instructions further cause the network system to identify a service provider from a plurality of service providers to fulfill the request for the network-based service by the first user.

14. A computer-implemented method comprising:
determining, based on historical data associated with past instances of a network-based service, a plurality of pre-computed service metrics associated with the network-based service;
maintaining the plurality of pre-computed service metrics in a database;
in response to receiving, from a user device of a first user of the network-based service, session data associated with the first user, retrieve, using the session data, a first pre-computed service metric from the plurality of pre-computed service metrics maintained in the database by querying the database using a start location and a service location indicated by the session data;
transmitting, to the user device of the first user, a set of data to cause a user application executing on the user device to present a user interface for submitting a request for the network-based service, wherein the user interface displays information relating to the first pre-computed service metric retrieved using the session data associated with the first user; and
in response to receiving, from the user device, request data corresponding to the request for the network-based service by the first user, associating the first pre-computed service metric with the request.

15. The computer-implemented method of claim 14, further comprising translating at least one of the start location and the service location to a search key for querying the database for the first pre-computed service metric.

16. The computer-implemented method of claim 14, further comprising:
translating the start location and the service location to a first search key and a second search key, respectively; and
querying the database for the first pre-computed service metric using the first search key and the second search key.

17. The computer-implemented method of claim 14, further comprising:
translate the start location to a first search key for querying the database for the first pre-computed service metric by (i) converting the start location to a first intermediate identifier, and (ii) converting the first intermediate identifier to the first search key; and
translate the service location to a second search key for querying the database for the first pre-computed service metric by (i) converting the service location to a second intermediate identifier, and (ii) converting the second intermediate identifier to the second search key.

18. The computer-implemented method of claim 14, wherein the first pre-computed service metric corresponds to a fare estimate for fulfillment of the first user's request for the network-based service.

19. The computer-implemented method of claim 14, further comprising:
determining, in response to receiving the session data, a dynamic parameter based on the session data; and
wherein associating the first service pre-computed metric with the request for the network-based service by the first user comprises determining a service parameter for request for the network-based service by the first user based on the dynamic parameter and the first pre-computed service metric.

20. A non-transitory computer-readable medium storing instructions that, when executed by one or more processors of a network system, cause the network system to:

determine, based on historical data associated with past instances of a network-based service, a plurality of pre-computed service metrics associated with the network-based service;

maintain the plurality of pre-computed service metrics in a database;

in response to receiving, from a user device of a first user of the network-based service, session data associated with the first user, retrieve, using the session data, a first pre-computed service metric from the plurality of pre-computed service metrics maintained in the database by querying the database using a start location and a service location indicated by the session data;

transmit, to the user device of the first user, a set of data to cause a user application executing on the user device to present a user interface for submitting a request for the network-based service, wherein the user interface displays information relating to the first pre-computed service metric retrieved using the session data associated with the first user; and in response to receiving, from the user device, request data corresponding to the request for the network-based service by the first user, associate the first pre-computed service metric with the request.

* * * * *